M. COPELAND.
ATTACHMENT FOR GRAIN DRILLS.
APPLICATION FILED NOV. 13, 1911.
1,064,616.
Patented June 10, 1913.
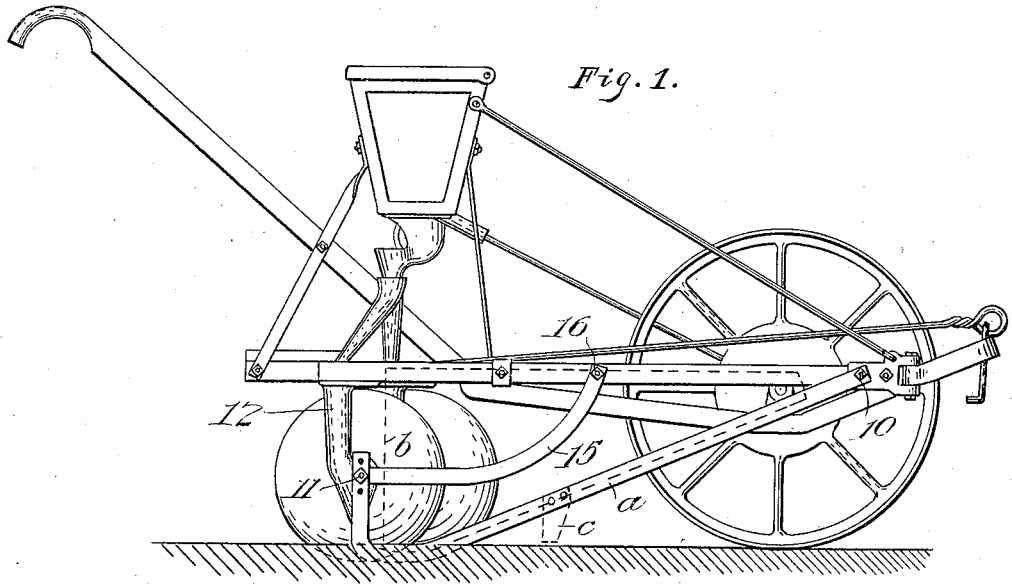
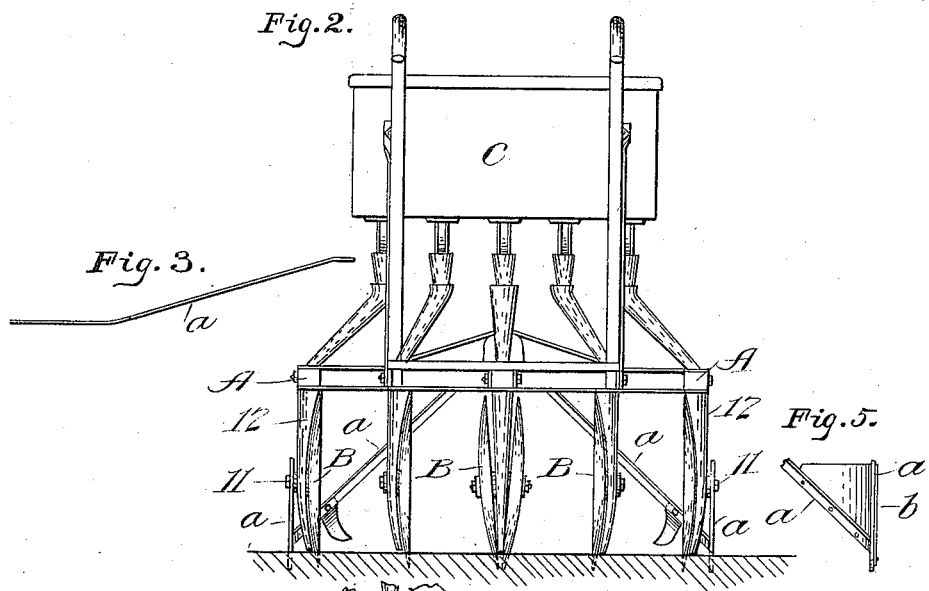
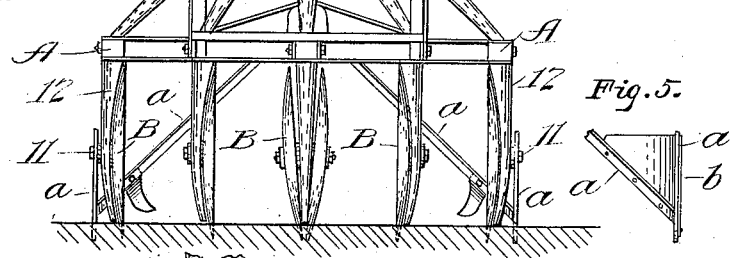
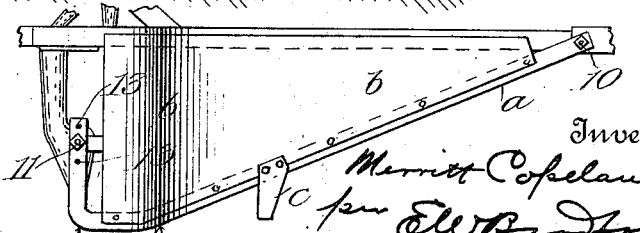

UNITED STATES PATENT OFFICE.

MERRITT COPELAND, OF ST. PAUL, INDIANA.

ATTACHMENT FOR GRAIN-DRILLS.

1,064,616.

Specification of Letters Patent.

Patented June 10, 1913.

Application filed November 13, 1911. Serial No. 660,001.

*To all whom it may concern:*

Be it known that I, MERRITT COPELAND, a citizen of the United States, residing at St. Paul, in the county of Decatur and State of Indiana, have invented certain new and useful Improvements in Attachments for Grain-Drills, of which the following is a specification.

My said invention consists in an attachment for grain drills, especially of that type known as "five-row" drills, comprising a "three-cornered" frame supported at its front end on a single wheel and carrying the drill mechanism on the wide rear portion thereof, said invention having for its purpose steadying such a drill laterally in operation and at the same time provide means for turning aside the stalks of corn, as when the drill is used for drilling grain between the rows in fields of partly grown corn, all as will be hereinafter more fully described and claimed.

Referring to the accompanying drawings, which are made a part hereof, and of which similar reference characters indicate similar parts, Figure 1 is a side elevation of a grain drill of the character described provided with steadying devices and fenders constituting my said invention, Fig. 2 a rear elevation of the same, and Figs. 3, 4 and 5 detailed views illustrating parts separately.

In said drawings the portions marked A represent the frame of the grain drill, B the disks, and C the seed box. All of these parts are of a form and construction in common use, or may be of any other appropriate form or construction, and require no special description, being shown merely to illustrate my invention in operative form.

The steadying device comprises runners $a$ bent of a form substantially as shown in Figs. 1, 2 and 3 with a foot, or part from $x$ to $z$ in Fig. 4, adapted to run upon the ground. Their front ends are secured by a bolt 10 to the front end of the drill frame, and their rear ends are secured by a bolt 11 to the outside of the hangers 12 on which the outside disks B are journaled. The extreme rear ends of said runners are bent upward, and have a series of perforations 13 in their vertical portions for the bolts 11, by means of which the horizontal portions which rest upon the ground may be adjusted relative to the drill frame and disks. Curved stalk fenders $c$ are preferably attached to the bars, or runners, in a position where their lower points will be in close proximity with the ground and their forward edges will meet and turn the corn stalks from under the disks.

A fender $b$ as indicated by dotted lines in Fig. 1 and by whole lines in Fig. 4, is also preferably attached to each runner $a$ at its lower edge and covers the space between said runner and the outer bar of the grain drill frame, thus preventing stalks from interfering with the work of the drill. Other bars 15 preferably run from the bolts 11 and are attached by bolts 16 to an intermediate point on the grain drill frame, and serve as supports for the fenders, or shields, $b$, and also to strengthen and brace the structure.

In operation the runners are attached as shown in the drawings, the height being adjusted as may be desired, in relation to the disks, through the medium of the series of perforations 13, as will be readily understood. By letting said runners down where they will rest firmly on the ground the rocking of the grain drill is prevented and the operator is able to guide and handle it much more conveniently and with less exertion, and the danger of injury to the growing corn is largely obviated.

Having thus fully described my said invention, what I claim as new and desire to secure by Letters Patent, is:—

1. The combination with a grain drill of that type having a frame formed narrow at its front and wide at its rear with said front supported on a single wheel and the drill mechanism mounted on said rear, of steady runners for laterally supporting the rear end of said drill mounted on each side of said frame, each of said runners consisting of a bar attached to the front end of said frame and extending at an angle outwardly and downwardly from said front end toward the ground and having a horizontal foot or bearing portion adapted to rest upon the ground outside and adjacent to the end disks and having a vertical standard formed to be adjustably attached to the rear end of said frame, substantially as set forth.

2. In a grain drill, the combination with the frame, the disks and drill mechanism, of runners attached to the sides thereof with their rear ends resting upon the ground, and fenders also attached to said runners in position to deflect the stalks of corn from the disks of the drill, substantially as set forth.

3. A grain drill comprising runners adjustably attached to its sides, fenders attached to said runners, and shields extending from said runners upward toward the frame, substantially as set forth.

In witness whereof, I have hereunto set my hand and seal at St. Paul, Indiana this 11th day of November, A. D. nineteen hundred and eleven.

MERRITT COPELAND. [L. S.]

Witnesses:
 GEORGE L. HESS,
 OTIS O. THOMPSON.

Copies of this patent may be obtained for five cents each, by addressing the "Commissioner of Patents, Washington, D. C."